UNITED STATES PATENT OFFICE.

MOSES H. KLUBER, OF DODGE CITY, KANSAS.

MEDICATED OR TONIC BEER.

SPECIFICATION forming part of Letters Patent No. 386,250, dated July 17, 1888.

Application filed December 8, 1887. Serial No. 257,286. (No specimens.)

*To all whom it may concern:*

Be it known that I, MOSES H. KLUBER, of Dodge City, in the county of Ford and State of Kansas, have invented a new and useful Improvement in Beverages, of which the following is a specification.

My beverage is an improved beer which is healthful, palatable, and not intoxicating, and therefore adapted for use by all classes of persons.

The ingredients of and manner of making the beer are as follows:

*Ingredients and their proportions.*—Fourteen ounces malt; seven ounces rye-flour; one-half ounce ground calamus-root; one-fifth ounce crushed spearmint, (leaves and stems;) one-fourth ounce hops; one-fourth ounce alcohol, (by measure;) one-tenth ounce lemon-oil, (by measure;) one-half ounce fresh yeast; one-half ounce lemon-peel; sixteen ounces sugar, and three gallons water.

*Mode of making the beer.*—For convenience, two vats or tubs may be employed, and one of them provided with a strainer-bottom, and each with a faucet for drawing off its contents. Mix the malt and rye-flour moistened with a small quantity of warm water, and let the mass stand twelve hours. Then knead it into a stiff dough and roll the latter into a flat sheet, about one inch thick, and cut into pieces about six inches in diameter. Bake these pieces until hard and brown (not burned) in an oven heated to a low degree. Then break the cakes thus produced into small bits, which place in two gallons of boiling water. When they have dissolved, add the remaining gallon of water, (cold.) Cover the mixture a short time—say one hour—and finally strain the infusion thus obtained. Next put the calamus-root, spearmint, hops, and lemon-peel into one gallon of this malt-infusion, and boil, say, ten minutes. Dissolve the sugar in one-half gallon of the malt-infusion, strain the solution and add to the infusion, along with the boiling-infusion of calamus, spearmint, &c., and let the mixture stand covered until its temperature shall have lowered fifteen or twenty degrees. Then dissolve the yeast in a small quantity of the mixture, strain the solution and put in the alcohol and lemon extract, and add the whole to the said mixture. Now let the latter stand eight to ten hours, until a white froth or foam appears, which will indicate that the beer is made and ready to be put in bottles or other receptacles for use.

What I claim is—

A beverage composed of malt, rye-flour, calamus, spearmint, hops, alcohol, lemon extract, yeast, lemon-peel, sugar, and water, in about the proportions above stated.

MOSES H. KLUBER.

Witnesses:
JAMES McCURELY,
LOUIS KLUBER.